(12) United States Patent
Arreaza et al.

(10) Patent No.: US 11,209,301 B2
(45) Date of Patent: Dec. 28, 2021

(54) FLUID VOLUME DETERMINATION ENHANCED BY ASSESSMENT OF VEHICLE OPERATIVE STATE

(71) Applicant: GM Global Technology Operations LLC, Detroit, MI (US)

(72) Inventors: Carlos E. Arreaza, Oakville (CA); Joseph K. Moore, Whitby (CA); Tyler J. Jamieson, North York (CA); David C. Cochrane, Oshawa (CA)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 16/382,976

(22) Filed: Apr. 12, 2019

(65) Prior Publication Data
US 2020/0326221 A1 Oct. 15, 2020

(51) Int. Cl.
*G01F 23/00* (2006.01)
*G01F 22/00* (2006.01)
*F01N 11/00* (2006.01)

(52) U.S. Cl.
CPC .......... *G01F 23/0076* (2013.01); *G01F 22/00* (2013.01); *G01F 23/0092* (2013.01); *F01N 11/00* (2013.01); *F01N 2610/148* (2013.01)

(58) Field of Classification Search
CPC .......................... G01F 23/0076; G01F 23/0092
See application file for complete search history.

(56) References Cited

U.S. PATENT DOCUMENTS

| | | | |
|---|---|---|---|
| 9,297,686 B1 * | 3/2016 | Ross, Jr. | G01F 23/263 |
| 2017/0356408 A1 * | 12/2017 | Yang | F02D 41/26 |
| 2019/0033119 A1 * | 1/2019 | Lease | F17C 13/02 |
| 2019/0376826 A1 * | 12/2019 | Thomas | B60K 15/03006 |

* cited by examiner

*Primary Examiner* — Paul M. West
(74) *Attorney, Agent, or Firm* — Quinn IP Law

(57) ABSTRACT

A method of determining a volume of a fluid in a reservoir arranged in a vehicle includes assessing, via a controller, whether a first sensor operatively connected to the reservoir and configured to detect a predetermined level of the fluid in the reservoir has been triggered. The method also includes detecting, via a second sensor, a vehicle operative state indicative of inclination of a free surface of the fluid in the reservoir. The method additionally includes communicating, via the second sensor, the detected vehicle operative state to the electronic controller and determining a degree of inclination of the free surface of the fluid in response to the detected vehicle operative state. Furthermore, the method includes determining, via the controller, the volume of the fluid in the reservoir when the first sensor has been triggered in response to the determined degree of inclination of the free surface of the fluid.

20 Claims, 3 Drawing Sheets

FLUID VOLUME DETERMINATION ENHANCED BY ASSESSMENT OF VEHICLE OPERATIVE STATE

INTRODUCTION

The present disclosure is drawn to a determination of fluid volume present in a reservoir arranged in a vehicle enhanced by an assessment of the vehicle's operative state.

Motor vehicles employ a variety of onboard storage tanks or reservoirs to hold fluids used during vehicle operation. For example, one reservoir may be specifically designed and packaged to hold a windshield washer fluid, while a separately designed and positioned reservoir may be used to hold a "diesel-exhaust-fluid" or DEF.

Windshield washer fluid is used in motor vehicles for cleaning the windshield with windshield wipers. Windshield washer fluid comes in many formulations, but is generally a combination of solvents with a detergent, sometimes with added methylated spirits to give the product a lower freezing temperature. A switch-controlled electrical pump may be used to spray the washer fluid onto the windshield, typically via jets mounted either beneath the windshield or beneath the wiper blade(s). The windshield wipers are typically automatically turned on when the washer fluid is sprayed, cleaning dirt and debris off the windshield. Some vehicles use the same method to clean the rear window or the headlights, frequently drawing washer fluid from the same reservoir.

DEF is generally an aqueous solution of urea containing ammonia ($NH_3$). DEF is used in a process called selective catalytic reduction (SCR) to reduce emissions of oxides of nitrogen ($NO_X$) from the exhaust gas of diesel engines employed in motor vehicles. An SCR-equipped vehicle usually carries its urea solution onboard in a specially designed reservoir. The urea solution is typically dosed or injected into the SCR system during engine operation at a metered rate equivalent to 3-5% of consumption of the diesel fuel.

Sensor(s) are frequently used to detect a fluid level indicative of the fluid volume within the respective reservoir, and inform the vehicle's operator when a refill of the reservoir is required. When the motor vehicle undergoes acceleration, is traversing non-flat ground, or is stationary on an incline, the level of fluid in the respective reservoir may shift, and the employed sensor(s) may indicate a volume of fluid that is greater or smaller than actual.

SUMMARY

A method of determining a volume of a fluid in a reservoir arranged in a vehicle includes assessing, via the electronic controller, whether a first sensor operatively connected to the reservoir and configured to detect a predetermined level of the fluid in the reservoir has been triggered. The method also includes detecting, via a second sensor, a vehicle operative state indicative of inclination or pitch of a free, i.e., unconstrained, surface of the fluid in the reservoir. The method additionally includes communicating, via the second sensor, the detected vehicle operative state to an electronic controller and determining a degree of inclination of the free surface of the fluid in the reservoir in response to the detected vehicle operative state. Furthermore, the method includes determining, via the electronic controller, the volume of the fluid in the reservoir when the first sensor has been triggered in response to the determined degree of inclination of the free surface of the fluid in the reservoir.

The method may also include generating, via the electronic controller, a sensory signal when the determined volume of the fluid in the reservoir is at or below a predetermined volume.

According to the method, after the sensory signal has been generated, the first sensor may cease being triggered in response to the determined degree of inclination of the free surface of the fluid. The ceasing of the first sensor being triggered may be identified as the reservoir having been refilled. The method may additionally include deactivating or generating a reset of the sensory signal in response to the reservoir having been refilled.

The detected vehicle operative state may be a dynamic condition including at least one of a lateral and a longitudinal acceleration of the vehicle.

Alternatively, the detected vehicle operative state is a stationary position of the vehicle on an incline.

The method may additionally include storing by the electronic controller each instance the first sensor has been triggered and the corresponding determined volume of the fluid in the reservoir.

According to the method, the stored records of each instance the first sensor has been triggered and the corresponding determined volume of the fluid in the reservoir may be used to execute, via the electronic controller, a fluid volume tracking algorithm of fluid volume change over time to determine the volume of fluid in the reservoir when the first sensor has been triggered.

The controller may be programmed with a look-up table compiled from empirically ascertained values of the volume of the fluid in the reservoir at corresponding degrees of inclination of the free surface in the reservoir and the predetermined volume of the fluid. In such an embodiment, determining the volume of the fluid in the reservoir when the first sensor has been triggered may be accomplished via the controller accessing the look-up table.

The fluid may be one of a diesel-exhaust-fluid (DEF) and a windshield washer fluid.

The method may also include reducing sloshing of the fluid within the reservoir and repeated toggling of the first sensor during dynamic maneuvers of the vehicle via a baffle arranged inside the reservoir.

A system for determining a volume of a fluid in a reservoir arranged in a vehicle employing the above-described method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
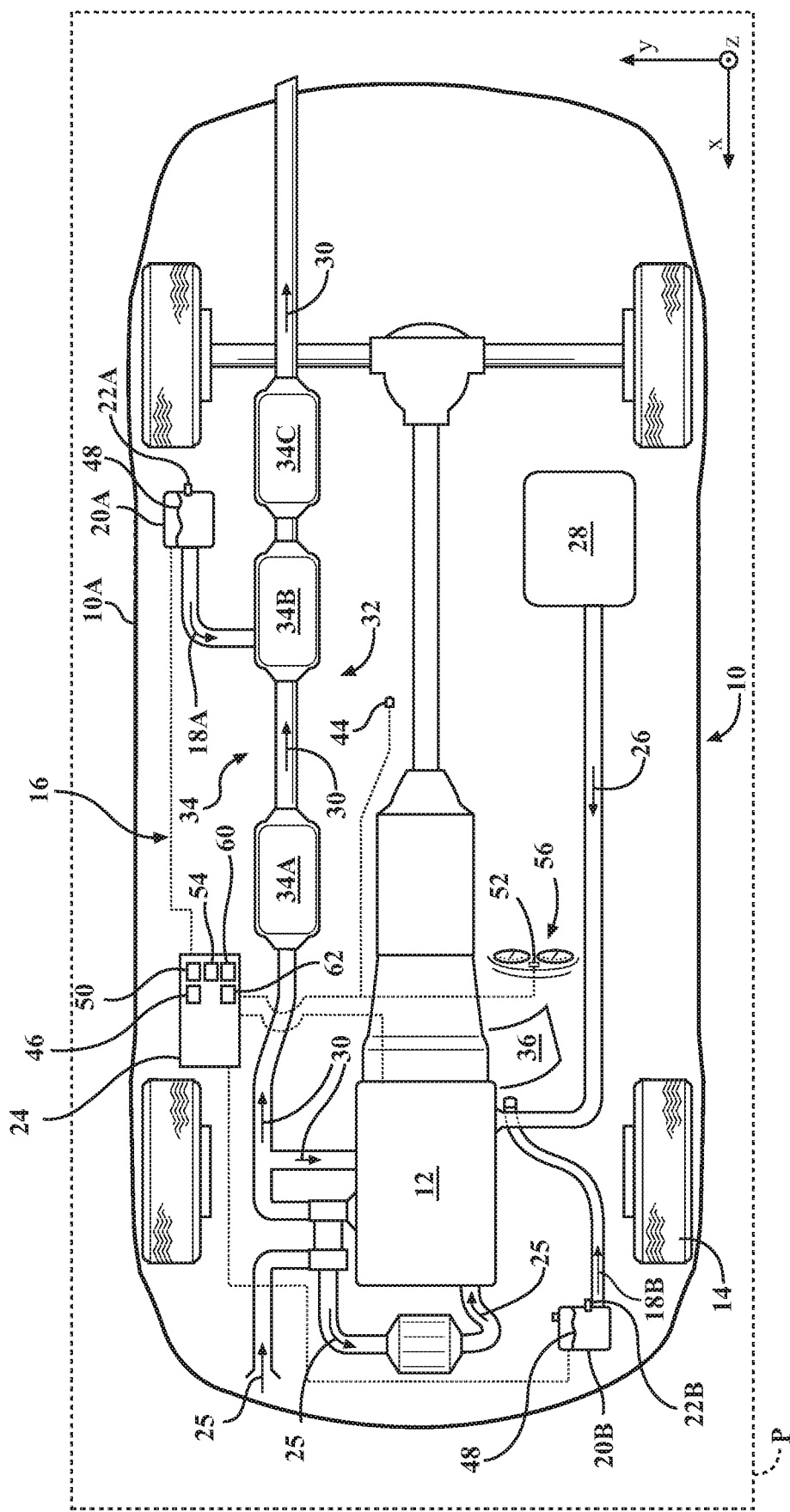
FIG. 1 is a schematic plan view of a motor vehicle having a number of reservoirs holding various fluids used during operation of the vehicle, according to the present disclosure.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the internal combustion engine 12 may be a spark-ignition type, specific reference in the ensuing disclosure will be made to a compression-ignition or diesel type of an engine. Additionally, the vehicle 10 may employ hybrid propulsion, where torque output from the engine 12 is augmented by other power sources, such as electric motor(s). The vehicle 10 is generally characterized by a vehicle body 10A arranged in a vehicle body plane X-Y. The vehicle body plane X-Y may be substantially parallel to a road surface supporting the vehicle 10, which may be defined by the horizontal plane P when the vehicle is positioned on level ground.

The vehicle 10 also includes a system 16 (shown in FIG. 1) for determining, under a variety of conditions, a volume of a liquid or fluid 18 held by a reservoir 20 arranged in the subject vehicle. The vehicle 10 may include a number of various reservoirs 20 configured to hold specific fluids 18 used during operation of the vehicle. Many such fluids are not recirculated into their respective reservoirs during usage, but are used up by vehicle systems or discharged to the environment surrounding the vehicle 10. Accordingly, one or more first sensor(s) 22 may be operatively connected to the respective reservoir 20 and employed to detect a specific level, to be described below, of the fluid 18 therein. Some non-limiting examples of fluids 18 and respective reservoirs 20 will be discussed in detail below.

Figure 3:
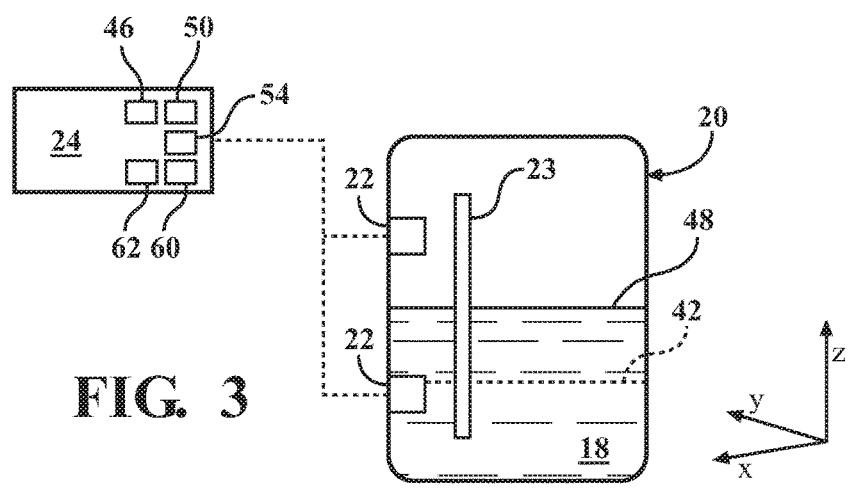
FIG. 3 is a schematic illustration of a representative fluid reservoir having a baffle configured to control sloshing of the fluid and repeated toggling of a fluid level sensor during dynamic maneuvers of the vehicle, according to the present disclosure.
Figure 4:
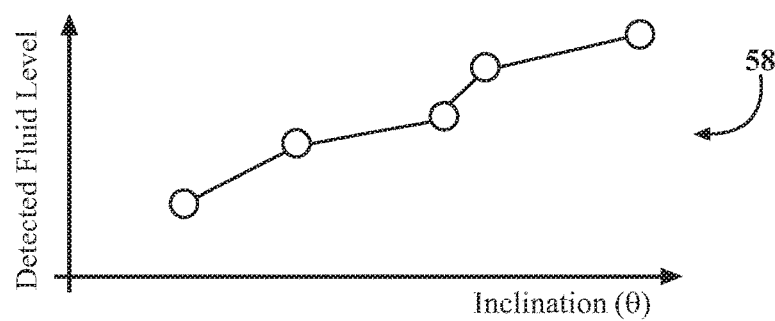
FIG. 4 is a graphical plot of representative variation of detected fluid level in the reservoirs shown in FIGS. 2A, 2B, and 3 as a result of the vehicle being subjected to the operative state.

When the vehicle 10 is subjected to certain operative states, such as when the vehicle experiences acceleration, is traversing non-flat ground, or is stationary on an incline, the fluid may shift in the reservoir, and the level detected by the first sensor(s) 22 may no longer be representative of the fluid volume remaining in the reservoir. A graphical plot of representative variation of detected fluid level in the reservoir 20 as a result of the vehicle 10 being subjected to the operative state is shown in FIG. 4. As understood, a fluid 18 will tend to slosh or splash and move around the reservoir 20 during repeated dynamic maneuvers experienced by the vehicle 10. Such sloshing of the fluid 18 may expose and trigger the first sensor(s) 22, thus sending an erroneous signal with respect to the volume of the fluid in the reservoir 20. As shown in FIG. 3, the system 16 may include a baffle 23 arranged inside the reservoir 20. The baffle 23 is intended to reduce sloshing of the fluid 18 within the reservoir 20 and repeated toggling of the first sensor 22 during dynamic maneuvers of the vehicle 10.

As shown in FIG. 1, the system 16 also includes an electronic controller 24. The controller 24 may be a stand-alone unit, or be part of an electronic control unit (ECU) that regulates operation of the engine 12. The controller 24 is arranged on the vehicle 10 and includes a processor and a readily accessible non-transitory memory. Instructions for controlling operation of the system 16 are programmed or recorded in the memory of the controller 24 and the processor is configured to execute the instructions from the memory during operation of the vehicle 10. The controller 24 is also in electronic communication with the sensor(s) 22 and is generally programmed for assessing a volume of the fluid 18 in the reservoir 20, as well as for regulation of other vehicle systems.

Internal combustion in the diesel engine 12 occurs when a specific amount of ambient air flow 25 is mixed with a metered amount of fuel 26 supplied from a fuel tank 28 and the resultant air-fuel mixture is compressed inside the engine's cylinders (not shown). Exhaust gas 30 is emitted from the engine 12 as a by-product of combustion, and is removed to the ambient through an exhaust system 32. As shown, the exhaust system 32 for a diesel engine 12 may include an exhaust after-treatment (AT) system 34. As shown, the AT system 34 includes a series of exhaust after-treatment devices configured to methodically remove largely carbonaceous particulate byproducts and emission constituents of engine combustion from the exhaust gas 30 flow. As shown, specific exhaust after-treatment devices may include a diesel oxidation catalyst 34A, a selective catalytic reduction (SCR) catalyst 34B, and a diesel particulate filter 34C.

As shown in FIG. 1, a "diesel-exhaust-fluid" or DEF 18A is held in a reservoir 20A for a metered supply to a stream of the exhaust gas 30 as part of an SCR process employed in conjunction with the SCR catalyst 34B. The DEF 18A is a gaseous reductant, typically anhydrous ammonia, aqueous ammonia or urea. The SCR process is generally used to reduce exhaust emissions of internal combustion engines, such as the engine 12. Specifically, SCR process is a means of converting oxides of nitrogen, also referred to as $NO_X$ with the aid of the SCR catalyst 34B into diatomic nitrogen, $N_a$, and water, $H_2O$. The reservoir 20A includes a sensor 22A configured to detect a level of DEF 18A inside the reservoir. The controller 24 may be in electronic communication with the sensor(s) 22A for assessing a volume of the DEF 18A in the reservoir 20A and programmed to regulate the injection of the DEF into the exhaust gas 30 flow during operation of the engine 12.

As also shown in FIG. 1, the vehicle 10 includes a washer fluid 18B held in a reservoir 20B. The washer fluid 18B is usually used for cleaning a windshield 36 of the vehicle 10 with windshield wipers (not shown), and is generally characterized as "windshield washer fluid". Typically, the washer fluid 18B is a formulation of solvents with a detergent, sometimes with added methylated spirits to achieve a lower fluid freezing temperature. The washer fluid 18B contained in the reservoir 20B may be also used to clean such vehicle components as rear window or headlights (not shown). Typically, the washer fluid 18B is supplied from the reservoir 20B to the subject vehicle components by an electric fluid pump (not shown). The reservoir 20B includes a sensor 22B configured to detect a level of the washer fluid 18B inside the reservoir. The controller 24 may be in electronic communication with the sensor(s) 22B for assessing a volume of the washer fluid 18B in the reservoir 20B.

Each of the reservoir 20A with corresponding DEF 18A and sensor(s) 22A, and the reservoir 20B with corresponding washer fluid 18B and sensor(s) 22B, is an example of reservoir-held fluid assessed by the system 16 via first sensor(s) 22 under a variety of vehicle operative conditions. Accordingly, from hereon, the present disclosure will generally reference the contemplated reservoir with numeral 20, the fluid held therein with numeral 18, and the first sensor(s) employed to detect the level of the fluid with numeral 22, and indicate these elements likewise in FIGS. 2-4.

The first sensor 22 may be configured as a magnetic sensor or a reed switch. Generally, a reed switch is an electrical switch operated by an applied magnetic field, and includes a pair of contacts on ferromagnetic metal reeds in a hermetically sealed glass envelope. The switch contacts may be normally open, closing when a magnetic field is present, or normally closed and opening when a magnetic field is applied. As an example, the first sensor 22 may be configured as a float switch. Specifically, a float encircling a stationary non-magnetic stem may be provided with permanent magnets. As the float rises or lowers with fluid level, the magnetic field generated from within the float actuates a hermetically sealed, magnetic reed switch mounted within the stem. A multi-station float switch may use a separate reed switch, an individual first sensor 22, for each discrete fluid level being monitored.

The first sensor(s) 22 is in communication with the electronic controller 24 and configured to detect a predetermined, e.g., low, level 42 of the fluid 18 in the reservoir 20. The controller 24 is programmed to receive a signal from the first sensor(s) 22 and communicate to the vehicle's operator that the amount of fluid 18 remaining within the subject reservoir 20 has reached the predetermined level 42. The system 16 also includes a second sensor 44 (shown in FIG. 1) in communication with the electronic controller 24. The second sensor 44 is configured to detect an operative state 46 of the vehicle 10, wherein the operative state is indicative of inclination or pitch of a free surface 48 of the fluid 18 in the reservoir 20.

Figure 2A:
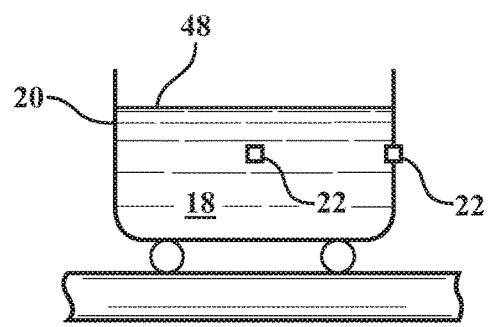
FIG. 2A is a schematic illustration of a representative fluid reservoir having a fluid level sensor, with the fluid free surface shown not subjected to significant external forces, and being generally parallel relative to a road surface, according to the present disclosure.
Figure 2B:
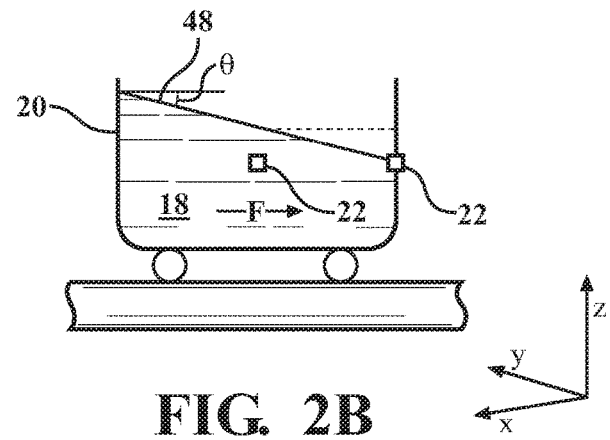
FIG. 2B is a schematic illustration of a representative fluid reservoir shown in FIG. 2A, with the fluid free surface shown being pitched at an angle as a result of the vehicle being subjected to an operative state, according to the present disclosure.

As shown in FIG. 2B, the detected vehicle operative state 46 may be a dynamic condition including either lateral acceleration, longitudinal acceleration, or yaw of the vehicle 10 imparting a force F to the fluid 18. Alternatively, the detected vehicle operative state 46 may be a stationary position or dynamic state of the vehicle 10 on an incline, thereby causing the vehicle to pitch either in a fore-aft or in a sideways direction. Within the context of the present disclosure, the term "free surface" denotes the surface of the fluid that is unconstrained by the walls of the reservoir and is in contact with a gas or vapor occupying the space in the reservoir directly above the fluid. The second sensor(s) 44 may, for example, be yaw sensors, accelerometers, inclinometers, or a combination of such sensors.

As shown in FIGS. 2A, 2B, and 3, a plurality of first sensors 22 may be used by the system 16. In the embodiment shown in FIGS. 2A and 2B, each of the first sensors 22 may be arranged in the plane X-Y to facilitate detection of the level of the fluid 18 in the reservoir 20 when the vehicle 10 is positioned on a compound incline, i.e., is pitched in both fore-aft and in sideways directions. Similarly, the plurality of first sensors 22 shown in FIGS. 2A and 2B may facilitate detection of the level of the fluid 18 when the vehicle operative state 46 includes a combination of lateral and longitudinal acceleration. As shown in FIG. 3, each of the plurality of first sensors 22 may be arranged along an axis Z perpendicular to the plane X-Y, i.e., spaced vertically apart from each other. In the embodiment shown in FIG. 3, each of the first sensors 22 may be configured to facilitate detection of distinct levels of the fluid 18, for example separately signifying a minimum level and a maximum level in the reservoir 20.

The second sensor 44 is also configured to communicate the detected vehicle operative state 46 via a signal to the electronic controller 24. The signals from the first and second sensors 22, 44 may be communicated to the electronic controller 24 via a data network, e.g. a Controller Area Network (CAN bus), arranged in the vehicle 10. The electronic controller 24 is additionally configured or programmed to determine a degree of inclination $\theta$ of the free surface 48 of the fluid 18 in the reservoir 20 with respect to a horizontal plane P in response to the detected vehicle operative state 46. The electronic controller 24 is also configured to assess whether the first sensor 22 has been triggered, thus indicating that the predetermined fluid level 42 in the reservoir 20 has been detected. The electronic controller 24 is further configured to determine the remaining volume of fluid 18 in the reservoir 20 when the first sensor 22 has been triggered in response to the determined degree of inclination $\theta$ of the free surface 48 of the fluid. In other words, the determined degree of inclination $\theta$ of the free surface 48, together with the detected predetermined fluid level 42 may be used by the controller 24 to determine the volume of the fluid 18 remaining in the reservoir 20. The requisite correlation between the determined degree of inclination $\theta$ of the free surface 48, the detected predetermined fluid level 42, and the volume of the fluid 18 may be accomplished by the controller 24 using a look-up table 50 programmed therein. The look-up table 50 may be compiled from empirically ascertained values of the volume of the fluid 18 residing in the reservoir 20 at various, corresponding degrees of inclination $\theta$ of the free surface 48 in the reservoir 20 at the predetermined fluid level 42.

The electronic controller 24 may be also configured to generate, i.e., trigger, a sensory signal 52 when the determined volume of the fluid 18 in the reservoir 20 is at or below a predetermined volume 54. In other words, the sensory signal 52 may be characterized as an indicator of a required refill of the reservoir 20. Furthermore, the electronic controller 24 may be configured to identify the first sensor 22 ceasing to be, or no longer being triggered in response to the determined degree of inclination $\theta$ of the fluid free surface 48 after having generated the sensory signal as the reservoir 20 having been refilled, or at least some amount of fluid 18 having been added. The electronic controller 24 may be also configured to deactivate, or generate a reset of the sensory signal 52 in response to thus identified refill of the reservoir 20. The sensory signal 52 may be displayed on an instrument panel 56 arranged in the interior of the vehicle 10.

The electronic controller 24 may also be configured to record, i.e., store, each instance the first sensor 22 has been triggered together with the corresponding determined at the time volume of the fluid 18 in the reservoir 20. As a result, the controller 24 would also store each of the corresponding detected vehicle operative state 46 and determined degree of inclination $\theta$ of the fluid free surface 48, and the level of the fluid 18 relative to the first sensor 22, which may be represented in a graph 58, as shown in FIG. 4. The controller 24 may also be programmed with a fluid volume tracking algorithm 60 of fluid volume change over time compiled from empirically ascertained values of the fluid volume in the reservoir 20 at corresponding degrees of inclination $\theta$ of the free surface 48 and the predetermined fluid volume 54. The electronic controller 24 may be further configured to execute the fluid volume tracking algorithm 60 upon the detection of the predetermined fluid level 42 to determine or assess the actual volume of fluid 18 in the reservoir 20.

Additionally, the electronic controller 24 may be configured to record detected vehicle operative state 46, determined degree of inclination θ of the fluid free surface 48, and the level of the fluid 18 (shown in the graph 58), when the vehicle 10 is experiencing acceleration, as indicated by the second sensor(s) 44, irrespective of whether the first sensor 22 is being triggered. In such an embodiment, the detected vehicle operative state 46, determined degree of inclination θ of the fluid free surface 48, and the level of the fluid 18 may be recorded when specific enabling conditions are met. Such enabling conditions may include verification by the electronic controller 24 that the vehicle 10 is traversing a level and relatively smooth road. Alternatively, such enabling conditions may include verification by the electronic controller 24 that the vehicle 10 is moving at a constant speed or is stationary on an incline.

The electronic controller 24 may also identify whether the first sensor 22 has been triggered. Accordingly, operative states 46, such as specific acceleration or vehicle pitch values, may be identified whether the sensor 22 is triggered and not. Such gathered information may facilitate generation of a reference file or look-up table 62 of the detected vehicle operative state 46 values, for example, actual magnitude of vehicle acceleration, and the corresponding degree of inclination θ of the fluid free surface 48 versus the actual volume of fluid inside the reservoir 20. The look-up table 62 may be programmed into the electronic controller 24 and be referenced along with the look-up table 50 by the electronic controller to identify the amount of fluid actually remaining in the reservoir 20.

Figure 5:
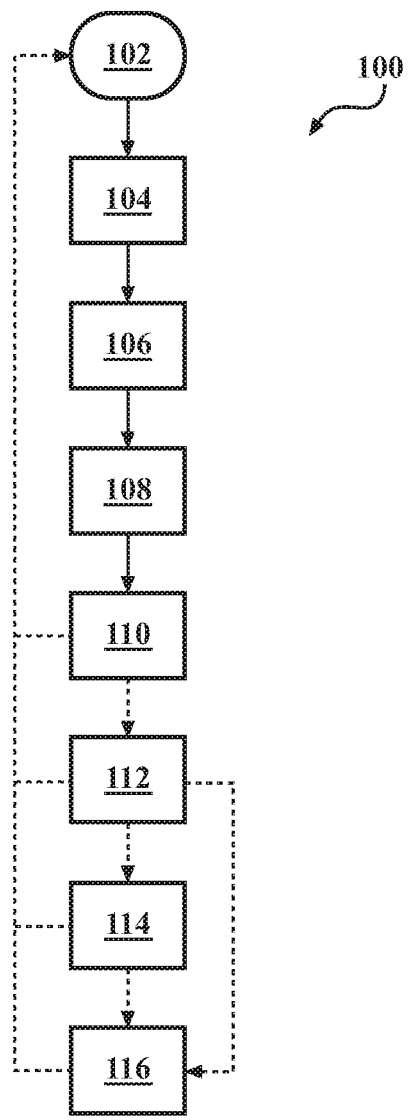
FIG. 5 is a flow diagram of a method of determining a volume of a fluid in a reservoir arranged in a vehicle shown in FIGS. 1-4, according to the present disclosure.

FIG. 5 depicts a method 100 of determining a volume of the fluid 18 in the reservoir 20 arranged in the vehicle 10, as described above with respect to FIGS. 1-4. For example, the fluid 18 may be diesel-exhaust-fluid (DEF) 18A used for the AT system 34, or washer fluid 18B, such as for the windshield 36. The method 100 may initiate in frame 102 with assessing, via the electronic controller 24, whether the first sensor 22 has been triggered, following which the method would advance to frame 104. In frame 104, the method includes ascertaining or detecting, via the second sensor 44, the vehicle operative state 46 indicative of inclination of the free surface 48 of the fluid 18 in the reservoir 20. After frame 104, the method advances to frame 106. In frame 106, the method includes communicating, via the second sensor 44, the detected vehicle operative state 46 to the electronic controller 24. As described above with respect to FIGS. 1-4, the detected vehicle operative state 46 may be a dynamic condition including at least one of a lateral and a longitudinal acceleration of the vehicle 10 or a stationary position of the vehicle 10 on an incline.

Following frame 106, the method proceeds to frame 108. In frame 108 the method includes determining, via the electronic controller 24, the degree of inclination θ of the fluid free surface 48 in the reservoir 20 in response to the detected vehicle operative state. The level of the fluid 18 when the first sensor 22 has been triggered at the determined degree of inclination θ is indicative that a certain amount of fluid has been depleted and is additionally representative of the amount of fluid remaining in the reservoir 20. After frame 108, the method advances to frame 110. In frame 110 the method includes determining, via the electronic controller 24, the volume of the fluid 18 in the reservoir 20 when the first sensor 22 has been triggered in response to the determined degree of inclination θ of the fluid free surface 48. As described above with respect to FIGS. 1-4, the controller 24 may be programmed with the look-up table 50 compiled from empirically ascertained values of the fluid volume in the reservoir 20 at corresponding degrees of inclination θ of the free surface 48 and the predetermined fluid volume 54. Accordingly, determining the volume of the fluid 18 in the reservoir 20 when the first sensor 22 has been triggered may be accomplished via the electronic controller 24 accessing the look-up table 50 and/or the look-up table 62.

Following frame 110, the method may proceed to frame 112 for generating, via the electronic controller 24, the sensory signal 52 when the determined volume of the fluid 18 is at or below the predetermined volume 54, i.e., indicative of the fluid dropping to or below some predetermined level. Accordingly, the sensory signal 52 may be indicative of a desired refill of the reservoir 20. After frame 112, the method may advance to frame 114. In frame 114, the method includes storing by the electronic controller 24 each instance the first sensor 22 has been triggered and the corresponding determined volume of the fluid 18 in the reservoir 20. According to the method, the storing of each instance the first sensor 22 has been triggered and the corresponding determined volume of the fluid 18 in the reservoir 20 may be used to execute, via the electronic controller 24, the fluid volume tracking algorithm 60 of fluid volume change over time. The algorithm 60 may then be used to determine the volume of fluid 18 in the reservoir 20 upon the detection of the predetermined fluid level 42, i.e., in response to the determined degree of inclination θ of the fluid free surface 48.

After either frame 112 or frame 114, the method may proceed to frame 116.

In frame 116, the method includes identifying that the reservoir 20 has been refilled when, after generating the sensory signal 52, the first sensor 22 ceases to be triggered in response to the determined degree of inclination θ of the fluid free surface 48. In frame 116 the method additionally includes deactivating or resetting the sensory signal in response to the reservoir 20 having been refilled. In general, the method 100 may include controlling or reducing sloshing of the fluid 18 within the reservoir 20 and repeated toggling of the first sensor during dynamic maneuvers of the vehicle via the baffle 23. After any of the frames 110-116, the method may return to frame 102 for assessing whether the first sensor 22 has been triggered. Accordingly, the method 100 may include continuous monitoring of the volume of the fluid 18 to determine when a refill of the reservoir 20 is required.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of determining a volume of a fluid in a reservoir arranged in a vehicle, the method comprising:
   assessing, via an electronic controller, whether a first sensor operatively connected to the reservoir and configured to detect a predetermined level of the fluid in the reservoir has been triggered by the predetermined level;
   detecting, via a second sensor, a vehicle operative state indicative of inclination of a free surface of the fluid in the reservoir;
   communicating, via the second sensor, the detected vehicle operative state to the electronic controller;
   determining, via the electronic controller, a degree of inclination of the free surface of the fluid in the reservoir in response to the detected vehicle operative state; and
   determining, via the electronic controller, the volume of the fluid in the reservoir when the first sensor has been triggered in response to the determined degree of inclination of the free surface of the fluid in the reservoir.

2. The method according to claim 1, further comprising generating, via the electronic controller, a sensory signal when the determined volume of the fluid in the reservoir is at or below a predetermined volume.

3. The method according to claim 2, further comprising:
   identifying, via the controller, that the reservoir has been refilled when, after generating the sensory signal, the first sensor ceases to be triggered in response to the determined degree of inclination of the free surface of the fluid in the reservoir; and
   deactivating, via the controller, the sensory signal in response to having been refilled.

4. The method according to claim 1, wherein the detected vehicle operative state is a dynamic condition including at least one of a lateral and a longitudinal acceleration of the vehicle.

5. The method according to claim 1, wherein the detected vehicle operative state is a stationary position of the vehicle on an incline.

6. The method according to claim 1, further comprising storing by the electronic controller each instance the first sensor has been triggered and the corresponding determined volume of the fluid in the reservoir.

7. The method according to claim 6, wherein the storing of each instance the first sensor has been triggered and the corresponding determined volume of the fluid in the reservoir is used to execute, via the electronic controller, a fluid volume tracking algorithm of fluid volume change over time to determine the volume of fluid in the reservoir when the first sensor has been triggered.

8. The method according to claim 1, wherein determining the volume of the fluid in the reservoir when the first sensor has been triggered is accomplished via the controller accessing a look-up table compiled from empirically ascertained values of the volume of the fluid in the reservoir at corresponding degrees of inclination of the free surface in the reservoir and the predetermined volume of the fluid and programmed into the controller.

9. The method according to claim 1, wherein the fluid is one of a diesel-exhaust-fluid (DEF) and a windshield washer fluid.

10. The method according to claim 1, further comprising reducing sloshing of the fluid within the reservoir and repeated toggling of the first sensor during dynamic maneuvers of the vehicle via a baffle arranged inside the reservoir.

11. A system for determining a volume of a fluid in a reservoir arranged in a vehicle, the system comprising:
   an electronic controller;
   a first sensor operatively connected to the reservoir, in communication with the electronic controller, and configured to detect a predetermined level of the fluid in the reservoir; and
   a second sensor in communication with the electronic controller and configured to detect a vehicle operative state indicative of inclination of a free surface of the fluid in the reservoir and communicate the detected vehicle operative state to the electronic controller;
   wherein the electronic controller is configured to:
      determine a degree of inclination of the free surface of the fluid in the reservoir in response to the detected vehicle operative state;
      assess whether the first sensor has been triggered by the predetermined level; and
      determine the volume of the fluid in the reservoir when the first sensor has been triggered in response to the determined degree of inclination of the free surface of the fluid in the reservoir.

12. The system according to claim 11, wherein the electronic controller is additionally configured to generate a sensory signal when the determined volume of the fluid in the reservoir is at or below a predetermined volume.

13. The system according to claim 12, wherein the electronic controller is additionally configured to:
   identify the first sensor ceasing to be triggered in response to the determined degree of inclination of the free surface of the fluid after having generated the sensory signal as a refill of the reservoir; and
   deactivate the sensory signal in response to the identified refill of the reservoir.

14. The system according to claim 11, wherein the detected vehicle operative state is a dynamic condition including at least one of a lateral and a longitudinal acceleration of the vehicle.

15. The system according to claim 11, wherein the detected vehicle operative state is a stationary position of the vehicle on an incline.

16. The system according to claim 11, wherein the electronic controller is additionally configured to store each instance the first sensor has been triggered and the corresponding determined volume of the fluid in the reservoir.

17. The system according to claim 16, wherein the electronic controller is additionally configured to execute a fluid volume tracking algorithm of fluid volume change over time using each stored instance the first sensor has been triggered and the corresponding determined volume of the fluid in the reservoir to determine the volume of fluid in the reservoir when the first sensor has been triggered.

18. The system according to claim 11, wherein the controller is programmed with a look-up table compiled from empirically ascertained values of the volume of the fluid in the reservoir at corresponding degrees of inclination of the free surface in the reservoir and the predetermined volume of the fluid, and wherein the controller is further configured to determine the volume of the fluid in the reservoir when the first sensor has been triggered is accomplished via accessing the look-up table.

19. The system according to claim 11, wherein the fluid is one of a diesel-exhaust-fluid (DEF) and a windshield washer fluid.

20. The system according to claim 11, further comprising a baffle arranged inside the reservoir configured to reduce sloshing of the fluid within the reservoir and repeated toggling of the first sensor during dynamic maneuvers of the vehicle.

\* \* \* \* \*